(12) United States Patent
Guo et al.

(10) Patent No.: US 10,405,169 B2
(45) Date of Patent: *Sep. 3, 2019

(54) DEVICE DISCOVERY METHOD, USER EQUIPMENT, SERVER, AND SYSTEM

(71) Applicant: Huawei Technologies Co., Ltd., Shenzhen (CN)

(72) Inventors: Yali Guo, Shenzhen (CN); Weihua Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/003,404

(22) Filed: Jun. 8, 2018

(65) Prior Publication Data

US 2018/0295495 A1 Oct. 11, 2018

Related U.S. Application Data

(63) Continuation of application No. 15/607,249, filed on May 26, 2017, now Pat. No. 10,009,749, which is a
(Continued)

(51) Int. Cl.
*H04W 52/02* (2009.01)
*H04W 8/00* (2009.01)
(Continued)

(52) U.S. Cl.
CPC ............ *H04W 8/005* (2013.01); *H04L 67/28* (2013.01); *H04W 48/08* (2013.01);
(Continued)

(58) Field of Classification Search
CPC ..... H04W 8/005; H04W 48/08; H04W 80/04; H04W 72/04; H04W 24/00; H04L 67/28
See application file for complete search history.

(56) References Cited

U.S. PATENT DOCUMENTS

2011/0258313 A1 10/2011 Mallik et al.
2011/0294474 A1 12/2011 Barany et al.
(Continued)

FOREIGN PATENT DOCUMENTS

CN 102547871 A 7/2012
CN 102647246 A 8/2012
(Continued)

OTHER PUBLICATIONS

Fodor, G. et al., "Design Aspects of Network Assisted Device-to-Device Communications," Accepted from Open Call, IEEE Communications Magazine, May 2011, 8 pages.
(Continued)

*Primary Examiner* — Chi Ho A Lee
(74) *Attorney, Agent, or Firm* — Slater Matsil, LLP

(57) ABSTRACT

Embodiments provide a device discovery method which relates to the field of communications technologies. The method includes: receiving, by a server, a discovery request, where the discovery request is used to request to discover another UE near a user equipment UE, and the discovery request includes a discovery category indication; generating discovery configuration information according to the discovery category indication, and sending the discovery configuration information to a base station or the UE, where the discovery configuration information is used to configure a parameter that is used when the base station or the UE detects another nearby UE; and receiving a discovery result sent by the base station or the UE.

20 Claims, 5 Drawing Sheets

Related U.S. Application Data continuation of application No. 14/852,227, filed on Sep. 11, 2015, now Pat. No. 9,681,285, which is a continuation of application No. PCT/CN2013/072581, filed on Mar. 14, 2013.

(51) Int. Cl.
*H04W 48/08* (2009.01)
*H04W 76/14* (2018.01)
*H04L 29/08* (2006.01)
*H04W 72/04* (2009.01)

(52) U.S. Cl.
CPC ..... *H04W 52/0225* (2013.01); *H04W 72/048* (2013.01); *H04W 76/14* (2018.02); *Y02D 70/00* (2018.01); *Y02D 70/1222* (2018.01); *Y02D 70/1224* (2018.01); *Y02D 70/1262* (2018.01); *Y02D 70/142* (2018.01); *Y02D 70/21* (2018.01)

(56) References Cited

U.S. PATENT DOCUMENTS

| | | |
|---|---|---|
| 2013/0005377 A1 | 1/2013 | Wang et al. |
| 2013/0178225 A1 | 7/2013 | Xing |
| 2013/0288668 A1 | 10/2013 | Pragada et al. |
| 2014/0094212 A1 | 4/2014 | Ahn et al. |
| 2014/0130137 A1 | 5/2014 | Baek et al. |
| 2014/0194115 A1 | 7/2014 | Yang et al. |
| 2015/0289125 A1 | 10/2015 | Van Phan et al. |
| 2015/0327046 A1 | 11/2015 | Lee et al. |
| 2015/0341774 A1 | 11/2015 | Fukuta et al. |
| 2015/0382174 A1 | 12/2015 | Guo et al. |

FOREIGN PATENT DOCUMENTS

| | | |
|---|---|---|
| CN | 102792759 A | 11/2012 |
| CN | 102858012 A | 1/2013 |

OTHER PUBLICATIONS

"3rd Generation Partnership Project; Technical Specification Group Services and System Aspects; Feasibility study for Proximity Services (ProSe) (Release 12)," 3GPP TR 22.803, V12.0.0, Dec. 2012, 40 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, V12.0.0, Mar. 2013, 290 pages.

US 10,405,169 B2

DEVICE DISCOVERY METHOD, USER EQUIPMENT, SERVER, AND SYSTEM

CROSS-REFERENCE TO RELATED APPLICATIONS

This application is a continuation of U.S. application Ser. No. 15/607,249, filed on May 26, 2017, which is a continuation of U.S. application Ser. No. 14/852,227, filed on Sep. 11, 2015, now U.S. Pat. No. 9,681,285, which is a continuation of International Application No. PCT/CN2013/072581, filed on Mar. 14, 2013. All of the afore-mentioned patent applications are hereby incorporated by reference in their entireties.

TECHNICAL FIELD

The present invention relates to the field of communications technologies, and in particular, to a device discovery method, a user equipment (UE), a server, and a system.

BACKGROUND

As a social application is widely used, a UE can learn which other UEs exist within a specific range near the UE. This technology of discovering another nearby UE is referred to as a proximity-based discovery technology. Further, proximity-based device-to-device (D2D) communication within a specific distance may also be implemented by virtue of the proximity-based discovery technology. Therefore, such devices having a D2D communication capability are referred to as proximity-based devices.

In a current system, a method for implementing proximity-based discovery is as follows. A proximity-based service server is disposed on a network, and a UE registers with the proximity-based service server so as to obtain a proximity-based service. When needing to discover another nearby UE, a UE sends a discovery request to the proximity-based service server, and the proximity-based service server controls measurement and discovery between UEs, or the proximity-based service server instructs a base station to control measurement and discovery between UEs. Therefore, using network control, the UE can discover a UE within a specific distance around.

The UE may discover as many other UEs as possible within a maximum range using communications network control, and report a discovery result to the server. In an actual application, there may be a large quantity of other UEs within a specific distance around a UE, and all proximity-based UEs are measured and discovered. However, the UE does not care about all the discovered proximity-based UEs, and therefore, a large amount of signaling interaction between the network and the UE is wasted, resulting in heavy power consumption of the UE.

SUMMARY

A device discovery method, a UE, a server, and a system that are provided in embodiments of the present invention can reduce signaling interaction in a process of discovering nearby devices, and reduce power consumption of the UE.

To achieve the foregoing objective, the embodiments of the present invention use the following technical solutions.

A first aspect of embodiments of the present invention provides a device discovery method. The method includes receiving, by a server, a discovery request, where the discovery request is used to request to discover another UE near a user equipment (UE), and the discovery request includes a discovery category indication. The method also includes generating discovery configuration information according to the discovery category indication, and sending the discovery configuration information to a base station or the UE, so that the base station or the UE discovers another UE near the UE according to the discovery configuration information, where the discovery configuration information is used to configure a parameter that is used when the base station or the UE detects another nearby UE. The method also includes receiving a discovery result sent by the base station or the UE.

With reference to the first aspect of the embodiments of present invention, in a first possible implementation manner, the discovery category indication includes at least one of the following: a service requirement indication, a discovery range indication, a target UE list, a capability requirement indication, and a target group indication.

With reference to the first possible implementation manner of the first aspect of the embodiments of present invention, in a second possible implementation manner, before the discovery request is received, the method further includes: receiving capability information and/or group information of the UE that registers with the server; and when the discovery category indication includes the capability requirement indication and/or the target group indication, the generating discovery configuration information according to the discovery category indication includes: generating the discovery configuration information according to the capability requirement indication and/or the target group indication, and the capability information and/or the group information of the UE that registers with the server.

With reference to the foregoing possible implementation manners of the first aspect of embodiments of the present invention, in a third possible implementation manner, the discovery result includes a list of UEs detected by the base station or the UE, where the detected UEs are near the UE and meet a requirement of the discovery category indication.

With reference to the first aspect of embodiments of the present invention, in a fourth possible implementation manner, before the discovery request is received, the method further includes: receiving capability information and/or group information of the UE that registers with the server, where the discovery category indication is used to instruct the server to: trigger detection on the another UE around the UE, and feedback, after the detection is complete, a list of all detected UEs, and service information, capability information, distance information, and/or group information of each UE.

With reference to the fourth possible implementation manner of the first aspect of embodiments of the present invention, in a fifth possible implementation manner, the discovery result includes: a list of UEs that are near the UE and detected by the base station or the UE, and service information, capability information, distance information, and/or group information of each UE.

With reference to the foregoing possible implementation manners of the first aspect of embodiments of the present invention, in a sixth possible implementation manner, if the discovery request is a discovery request sent by the UE, the discovery configuration information is sent to the base station, so that the base station performs device discovery according to the discovery configuration information; and after the discovery result sent by the base station is received, the method further includes: sending the discovery result to the UE. Alternatively, if the discovery request is a discovery request sent by an application server, the discovery configuration information is sent to the base station or the UE, so that the base station or the UE performs device discovery according to the discovery configuration information; and after the discovery result sent by the base station or the UE is received, the method further includes: sending the discovery result to the application server.

A second aspect of embodiments of the present invention provides a device discovery method. The method includes sending, by a user equipment (UE), a discovery request to a server, where the discovery request is used to request to discover another UE near the user equipment UE, and the discovery request includes a discovery category indication, so that the server generates discovery configuration information according to the discovery category indication, and then controls, according to the discovery configuration information, the UE to discover another nearby UE. The discovery configuration information is used to configure a parameter that is used when the base station or the UE detects another nearby UE. The method also includes discovering the another nearby UE under control of the server and according to the discovery configuration information, to obtain a discovery result.

With reference to the second aspect of embodiments of the present invention, in a first possible implementation manner, the discovery category indication includes at least one of the following: a service requirement indication, a discovery range indication, a target UE list, a capability requirement indication, and a target group indication.

With reference to the first possible implementation manner of the second aspect of embodiments of the present invention, in a second possible implementation manner, before the discovery request is sent to the server, the method further includes sending capability information and/or group information of the UE to the server.

With reference to the second aspect of embodiments of the present invention, the first possible implementation manner, or the second possible implementation manner, in a third possible implementation manner, the discovery result includes a list of UEs detected by the base station or the UE, where the detected UEs are near the UE and meet a requirement of the discovery category indication.

With reference to the second aspect of embodiments of the present invention, the first possible implementation manner, or the second possible implementation manner, in a fourth possible implementation manner, the discovery result includes a list of UEs that are near the UE and detected by the base station or the UE, and service information, capability information, distance information, and/or group information of each UE.

A third aspect of embodiments of the present invention provides a device discovery method. The method includes receiving, by a base station, discovery configuration information sent by a server, where the discovery configuration information is generated by the server according to a discovery category indication included in a discovery request, and is used to configure a parameter that is used when the base station detects another nearby UE. The method also includes discovering the another nearby UE according to the discovery configuration information, to obtain a discovery result. The method also includes sending the discovery result to the server, so that the server sends the discovery result to an initiator of the discovery request.

With reference to the third aspect of embodiments of the present invention, in a first possible implementation manner, the discovery category indication includes at least one of the following: a service requirement indication, a discovery range indication, a target UE list, a capability requirement indication, and a target group indication.

With reference to the third aspect of embodiments of the present invention or the first possible implementation manner, in a second possible implementation manner, the discovery result includes a list of UEs detected by the base station, where the detected UEs are near the UE and meet a requirement of the discovery category indication.

With reference to the third aspect of embodiments of the present invention or the first possible implementation manner, in a third possible implementation manner, the discovery result includes a list of UEs that are near the UE and detected by the base station, and service information, capability information, distance information, and/or group information of each UE.

A fourth aspect of embodiments of the present invention provides a server. The server includes a receiver, configured to receive a discovery request. The discovery request is used to request to discover another UE near a user equipment UE, and the discovery request includes a discovery category indication. The server also includes a processor, configured to generate discovery configuration information according to the discovery category indication received by the receiver. The server also includes a transmitter, configured to send the discovery configuration information generated by the processor to a base station or the UE, so that the base station or the UE discovers another UE near the UE according to the discovery configuration information. The discovery configuration information is used to configure a parameter that is used when the base station or the UE detects another nearby UE. The receiver is further configured to receive a discovery result sent by the base station or the UE.

With reference to the fourth aspect of embodiments of the present invention, in a first possible implementation manner, the discovery category indication includes at least one of the following: a service requirement indication, a discovery range indication, a target UE list, a capability requirement indication, and a target group indication.

With reference to the first possible implementation manner of the fourth aspect of embodiments of the present invention, in a second possible implementation manner, the receiver is further configured to: before receiving the discovery request, receive capability information and/or group information of the UE that registers with the server. When the discovery category indication includes the capability requirement indication and/or the target group indication, the processor is further configured to generate the discovery configuration information according to the capability requirement indication and/or the target group indication received by the receiver, and the capability information and/or the group information of the UE that registers with the server.

With reference to the fourth aspect of embodiments of the present invention or either of the foregoing possible implementation manners, in a third possible implementation manner, the discovery result includes a list of UEs detected by the base station or the UE, where the detected UEs are near the UE and meet a requirement of the discovery category indication.

With reference to the fourth aspect of embodiments of the present invention, in a fourth possible implementation manner, the receiver is further configured to: before receiving the discovery request, receive capability information and/or group information of the UE that registers with the server. The discovery category indication is used to instruct the server to: trigger detection on the another UE around the UE, and feedback, after the detection is complete, a list of all detected UEs, and service information, capability information, distance information, and/or group information of each UE.

With reference to the fourth possible implementation manner of the fourth aspect of embodiments of the present invention, in a fifth possible implementation manner, the discovery result includes a list of UEs that are near the UE and detected by the base station or the UE, and service information, capability information, distance information, and/or group information of each UE.

With reference to the fourth aspect of embodiments of the present invention or any one of the foregoing possible implementation manners, in a sixth possible implementation manner, the transmitter is further configured to: if the discovery request is a discovery request sent by the UE, send the discovery configuration information to the base station, so that the base station performs device discovery according to the discovery configuration information. The transmitter is further configured to, after the discovery result sent by the base station is received, send the discovery result to the UE; or, if the discovery request is a discovery request sent by an application server, send the discovery configuration information to the base station or the UE, so that the base station or the UE performs device discovery according to the discovery configuration information. The transmitter is further configured to, after the discovery result sent by the base station or the UE is received, send the discovery result to the application server.

A fifth aspect of embodiments of the present invention provides a user equipment (UE). The UE includes a transmitter, configured to send a discovery request to a server, where the discovery request is used to request to discover another UE near the user equipment UE, and the discovery request includes a discovery category indication, so that the server generates discovery configuration information according to the discovery category indication, and then controls, according to the discovery configuration information, the UE to discover another nearby UE. The discovery configuration information is used to configure a parameter that is used when the base station or the UE detects another nearby UE. The UE also includes a receiver, configured to receive the discovery configuration information delivered by the server. The UE also includes a processor, configured to discover the another nearby UE under control of the server and according to the discovery configuration information received by the receiver, so as to obtain a discovery result.

With reference to the fifth aspect of embodiments of the present invention, in a first possible implementation manner, the discovery category indication includes at least one of the following: a service requirement indication, a discovery range indication, a target UE list, a capability requirement indication, and a target group indication.

With reference to the first possible implementation manner of the fifth aspect of embodiments of the present invention, in a second possible implementation manner, the transmitter is further configured to, before sending the discovery request to the server, send capability information and/or group information of the UE to the server.

With reference to the fifth aspect of embodiments of the present invention, or the first possible implementation manner, or the second possible implementation manner, in a third possible implementation manner, the discovery result includes a list of UEs detected by the base station or the UE, where the detected UEs are near the UE and meet a requirement of the discovery category indication.

With reference to the fifth aspect of embodiments of the present invention, or the first possible implementation manner, or the second possible implementation manner, the discovery result includes a list of UEs that are near the UE and detected by the base station or the UE, and service information, capability information, distance information, and/or group information of each UE.

A sixth aspect of embodiments of the present invention provides a base station. The base station also includes a receiver, configured to receive discovery configuration information sent by a server. The discovery configuration information is generated by the server according to a discovery category indication included in a discovery request, and is used to configure a parameter that is used when the base station detects another nearby UE. The base station also includes a processor, configured to discover the another nearby UE according to the discovery configuration information received by the receiver, so as to obtain a discovery result. The base station also includes a transmitter, configured to send the discovery result obtained by the processor to the server, so that the server sends the discovery result to an initiator of the discovery request.

With reference to the sixth aspect of embodiments of the present invention, in a first possible implementation manner, the discovery category indication includes at least one of the following: a service requirement indication, a discovery range indication, a target UE list, a capability requirement indication, and a target group indication.

With reference to the sixth aspect of embodiments of the present invention or the first possible implementation manner, in a second possible implementation manner, the discovery result includes a list of UEs detected by the base station, where the detected UEs are near the UE and meet a requirement of the discovery category indication.

With reference to the sixth aspect of embodiments of the present invention or the first possible implementation manner, in a third possible implementation manner, the discovery result includes a list of UEs that are near the UE and detected by the base station, and service information, capability information, distance information, and/or group information of each UE.

A seventh aspect of embodiments of the present invention provides a server. The server also includes a receiving unit, configured to receive a discovery request, where the discovery request is used to request to discover another UE near a user equipment (UE), and the discovery request includes a discovery category indication. The server also includes a configuring unit, configured to generate discovery configuration information according to the discovery category indication received by the receiving unit. The server also includes a sending unit, configured to send the discovery configuration information to a base station or the UE, so that the base station or the UE discovers another UE near the UE according to the discovery configuration information. The discovery configuration information is used to configure a parameter that is used when the base station or the UE detects another nearby UE. The receiving unit is further configured to receive a discovery result sent by the base station or the UE.

With reference to the seventh aspect of the present invention, in a first possible implementation manner, the discovery category indication includes at least one of the following: a service requirement indication, a discovery range indication, a target UE list, a capability requirement indication, and a target group indication.

With reference to the seventh aspect of embodiments of the present invention, in a second possible implementation manner, the receiving unit is further configured to: before receiving the discovery request, receive capability information and/or group information of the UE that registers with the server; and when the discovery category indication includes a capability requirement indication and/or a target group indication, the configuring unit is further configured to generate the discovery configuration information according to the capability requirement indication and/or the target group indication, and the capability information and/or the group information of the UE that registers with the server.

With reference to the seventh aspect of embodiments of the present invention or either of the foregoing possible implementation manners, in a third possible implementation manner, the discovery result includes a list of UEs detected by the base station or the UE, where the detected UEs are near the UE and meet a requirement of the discovery category indication.

With reference to the seventh aspect of embodiments of the present invention, in a fourth possible implementation manner, the receiving unit is further configured to: before receiving the discovery request, receive capability information and/or group information of the UE that registers with the server; and the discovery category indication is used to instruct the server to: trigger detection on the another UE around the UE, and feedback, after the detection is complete, a list of all detected UEs, and service information, capability information, distance information, and/or group information of each UE.

With reference to the fourth possible implementation manner of the seventh aspect of embodiments of the present invention, in a fifth possible implementation manner, the discovery result includes a list of UEs that are near the UE and detected by the base station or the UE, and service information, capability information, distance information, and/or group information of each UE.

With reference to the seventh aspect of embodiments of the present invention or any one of the foregoing possible implementation manners, in a sixth possible implementation manner, the sending unit is further configured to: if the discovery request is a discovery request sent by the UE, send the discovery configuration information to the base station, so that the base station performs device discovery according to the discovery configuration information; and after the receiving unit receives the discovery result sent by the base station, send the discovery result to the UE; or, the sending unit is further configured to: if the discovery request is a discovery request sent by an application server, send the discovery configuration information to the base station or the UE, so that the base station or the UE performs device discovery according to the discovery configuration information; and after the receiving unit receives the discovery result sent by the base station or the UE, send the discovery result to the application server.

An eighth aspect of embodiments of the present invention provides a user equipment (UE). The UE includes a sending unit, configured to send a discovery request to a server, where the discovery request is used to request to discover another UE near the user equipment UE, and the discovery request includes a discovery category indication, so that the server generates discovery configuration information according to the discovery category indication, and then controls, according to the discovery configuration information, the UE to discover another nearby UE. The discovery configuration information is used to configure a parameter that is used when the base station or the UE detects another nearby UE. The UE also includes a receiving unit, configured to receive the discovery configuration information sent by the server. The UE also includes a discovery unit, configured to discover the another nearby UE under control of the server and according to the discovery configuration information received by the receiving unit, so as to obtain a discovery result.

With reference to the eighth aspect of embodiments of the present invention, in a first possible implementation manner, the discovery category indication includes at least one of the following: a service requirement indication, a discovery range indication, a target UE list, a capability requirement indication, and a target group indication.

With reference to the first possible implementation manner of the eighth aspect of embodiments of the present invention, in a second possible implementation manner, the sending unit is further configured to before sending the discovery request to the server, send capability information and/or group information of the UE to the server.

With reference to the eighth aspect of embodiments of the present invention, or the first possible implementation manner, or the second possible implementation manner, in a third possible implementation manner, the discovery result includes a list of UEs detected by the base station or the UE, where the detected UEs are near the UE and meet a requirement of the discovery category indication.

With reference to the eighth aspect of embodiments of the present invention, or the first possible implementation manner, or the second possible implementation manner, in a fourth possible implementation manner, the discovery result includes a list of UEs that are near the UE and detected by the base station or the UE, and service information, capability information, distance information, and/or group information of each UE.

A ninth aspect of embodiments of the present invention provides a base station. The base station includes a receiving unit, configured to receive discovery configuration information sent by a server. The discovery configuration information is generated by the server according to a discovery category indication included in a discovery request, and is used to configure a parameter that is used when the base station detects another nearby UE. The base station also includes a discovery unit, configured to discover the another nearby UE according to the discovery configuration information received by the receiving unit, so as to obtain a discovery result. The base station also includes a sending unit, configured to send the discovery result obtained by the discovery unit to the server, so that the server sends the discovery result to an initiator of the discovery request.

With reference to the ninth aspect of embodiments of the present invention, in a first possible implementation manner, the discovery category indication includes at least one of the following: a service requirement indication, a discovery range indication, a target UE list, a capability requirement indication, and a target group indication.

With reference to the ninth aspect of embodiments of the present invention or the first possible implementation manner, in a second possible implementation manner, the discovery result includes a list of UEs detected by the base station, where the detected UEs are near the UE and meet a requirement of the discovery category indication.

With reference to the ninth aspect of embodiments of the present invention or the first possible implementation manner, in a third possible implementation manner, the discovery result includes a list of UEs that are near the UE and detected by the base station, and service information, capability information, distance information, and/or group information of each UE.

A tenth aspect of embodiments of the present invention provides a device discovery system. The device discovery system also includes a server, a UE, and a base station. The server is configured to: receive a discovery request, where the discovery request is used to request to discover another UE near the user equipment UE, and the discovery request includes a discovery category indication. The server is also configured to generate discovery configuration information according to the discovery category indication and send the discovery configuration information to the base station or the UE, so that the base station or the UE discovers another UE near the UE according to the discovery configuration information, where the discovery configuration information is used to configure a parameter that is used when the base station or the UE detects another nearby UE. The server is also configured to receive a discovery result sent by the base station or the UE.

The UE is configured to: send the discovery request to the server, where the discovery request is used to request to discover another UE near the user equipment UE, and the discovery request includes the discovery category indication, so that the server generates the discovery configuration information according to the discovery category indication, and then controls, according to the discovery configuration information, the UE to discover the another nearby UE, where the discovery configuration information is used to configure the parameter that is used when the base station or the UE detects another nearby UE; and discover the another nearby UE under control of the server and according to the discovery configuration information, so as to obtain the discovery result.

The base station is configured to: receive the discovery configuration information sent by the server, where the discovery configuration information is generated by the server according to the discovery category indication included in the discovery request, and is used to configure the parameter that is used when the base station detects another nearby UE; discover the another nearby UE according to the discovery configuration information, so as to obtain the discovery result; and send the discovery result to the server, so that the server sends the discovery result to an initiator of the discovery request.

According to the device discovery method, the UE, the server, and the system that are provided in the embodiments of the present invention, a discovery request carries a discovery category indication, and the server generates discovery configuration information according to the discovery category indication, thereby discovering a nearby proximity-based UE of a specific category. Compared with a method in a current system in which all nearby UEs need to be discovered, embodiments of the present invention have the following advantages. Another UE of a category designated by a user may be discovered near the UE according to a user requirement, and a discovery result can meet a communication requirement of the user, thereby reducing unnecessary signaling interaction and reducing power consumption of the UE.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
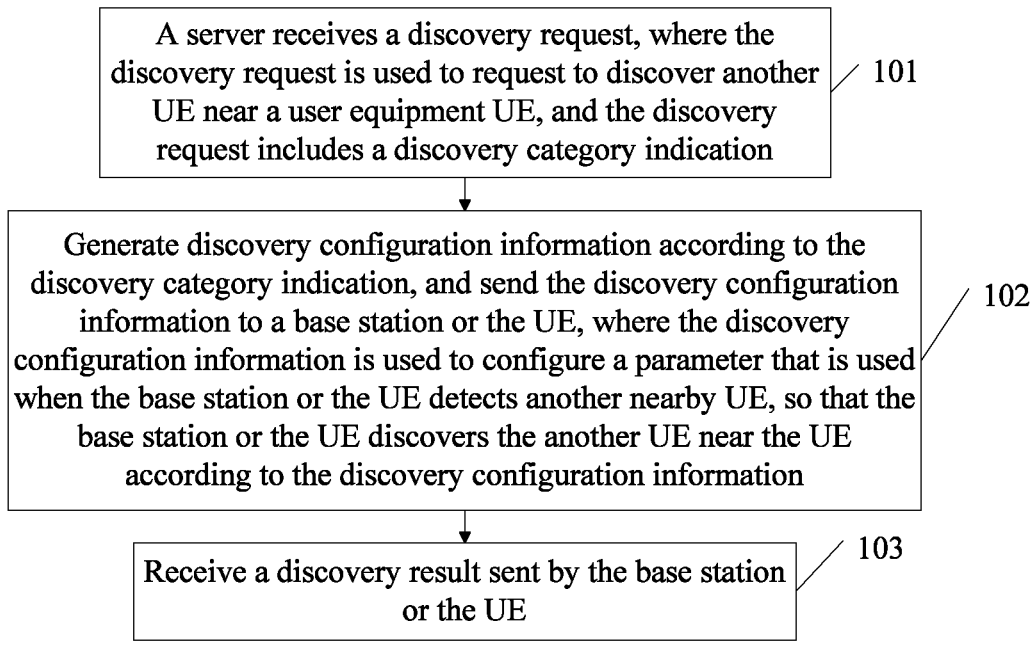
FIG. 1 is a flowchart of a device discovery method according to an embodiment of the present invention.

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other similar communications systems.

Various aspects are described in this specification with reference to a user equipment and/or a base station and/or a base station controller.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device, such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or a user equipment.

The base station (for example, an access point) may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base station (BTS, Base Transceiver Station) in the GSM or the CDMA, may also be a base station (NodeB) in the WCDMA, and may further be an evolved NodeB (NodeB, eNB, or e-NodeB) in the LTE, which is not limited in the present invention.

The base station controller may be a base station controller (BSC) in the GSM or the CDMA, or a radio network controller (RNC) in the WCDMA, which is not limited in the present application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

An embodiment of the present invention provides a device discovery method. As shown in FIG. 1, the method may include the following steps.

101. A server receives a discovery request, where the discovery request is used to request to discover another UE near a user equipment (UE), and the discovery request includes a discovery category indication.

The discovery category indication includes at least one of the following: a service requirement indication, a discovery range indication, a target UE list, a capability requirement indication, and a target group indication.

102. Generate discovery configuration information according to the discovery category indication, and send the discovery configuration information to a base station or the UE, so that the base station or the UE discovers another UE near the UE according to the discovery configuration information, where the discovery configuration information is used to configure a parameter that is used when the base station or the UE detects another nearby UE.

The discovery configuration information is used to configure the parameter that is used when the base station or the UE detects another nearby UE, and may include the discovery category indication, or a parameter that is obtained by converting the discovery category indication and can be identified by the base station or the UE.

Optionally, the server may receive in advance capability information and/or group information of the UE that registers with the server. In this way, after receiving the discovery request, the server may generate the discovery configuration information according to the capability requirement indication and/or the target group indication, and the capability information and/or the group information of the UE that registers with the server.

103. Receive a discovery result sent by the base station or the UE.

The server may send the discovery configuration information to the base station, and the base station controls the UE to perform proximity-based device discovery; or the server may directly send the discovery configuration information to the UE, and then control the UE to perform proximity-based device discovery.

Optionally, the UE may detect only a UE that meets a requirement of the discovery category indication. In some embodiments, the UE detects all other nearby UEs that may be detected, and then sends a list of the detected nearby UEs to the base station, and the base station performs filtering according to the discovery configuration information, so as to obtain a list of UEs that meet a requirement of the discovery category indication. In some embodiments, the base station does not perform filtering, but identifies, in a list of all other detected UEs according to the discovery category indication, related information about the nearby UEs that are detected by the UE, for example, may identify service information, capability information, distance information, and/or group information of each nearby UE.

According to the device discovery method provided in this embodiment of the present invention, a discovery request carries a discovery category indication, and a server generates discovery configuration information according to the discovery category indication, thereby discovering a nearby proximity-based UE of a specific category. Compared with a method in a current system in which all nearby UEs need to be discovered, the device discovery method has the following advantages. Another UE of a category designated by a user may be discovered near a UE according to a user requirement, and a discovery result can meet a communication requirement of the user, thereby reducing unnecessary signaling interaction and reducing power consumption of the UE.

Figure 2:
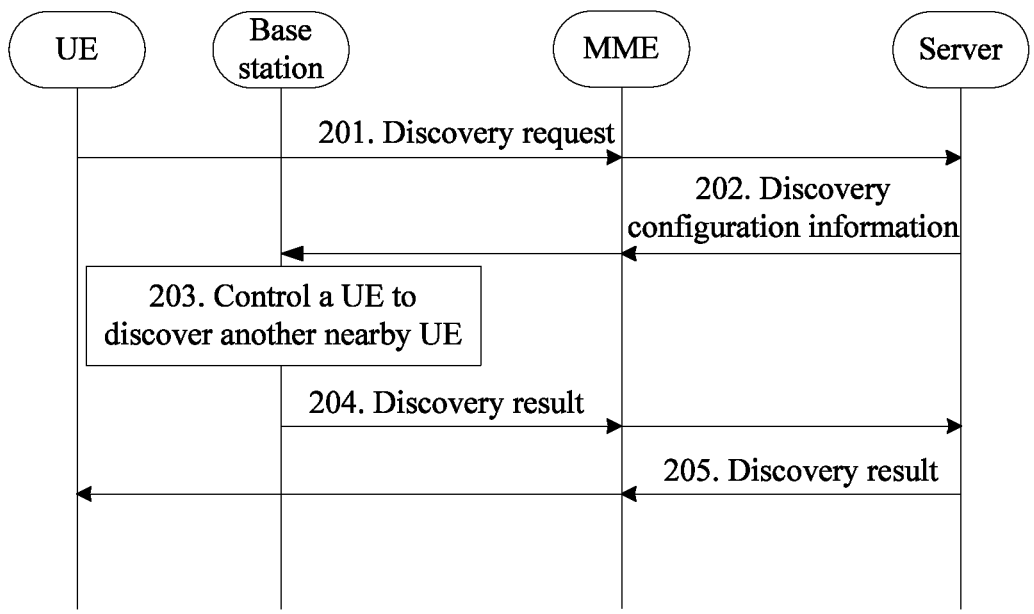
FIG. 2 is a flowchart of a device discovery method according to another embodiment of the present invention.

Another embodiment of the present invention provides a device discovery method. As shown in FIG. 2, the method includes the following steps.

201. A UE sends a discovery request to a server, where the discovery request is used to request to discover another UE near the user equipment (UE), and the discovery request includes a discovery category indication.

The discovery request carries an identifier of the UE that initiates the discovery request. A UE identifier may be a mobile subscriber integrated services digital network number (MSISDN), a Session Initiation Protocol uniform resource identifier (SIP URI), an IP address of the UE, or the like that is already defined in a communications network, or may be a temporary identifier assigned by a communications network, such as a packet-temporary mobile subscriber identity (P-TMSI) or a serving-temporary mobile subscriber identity (IS-TMSI), or may be a newly-defined identifier. Optionally, the UE may send the discovery request to the server by using an MME, and the MME may convert a message format of the discovery request. For example, the MME changes a message name to a message name supported by the server, or converts a received UE identifier into a UE identifier that can be identified by the server. For example, the UE identifier in the discovery request received by the MME is a temporary identifier, and the MME converts the temporary identifier into a fixed identifier of the UE, for example, converts a P-TMSI into an MSISDN or an IP address of the UE.

In this embodiment, when performing proximity-based service discovery, the UE may discover a proximity-based device around the UE, but because D2D communication has a higher requirement on a distance between devices and signal strength, the UE may not be capable of performing D2D communication with each discovered device. D2D communication can be implemented only when a distance between two UEs is close to some extent or signal strength meets a specific requirement. Therefore, the discovery category indication may include a service requirement indication and/or a discovery range indication, and may further include a target UE list, which designates a nearby UE that needs to be detected. For example, the UE includes, into the discovery request, its buddy list, which instructs to discover a UE that is in the buddy list and located near the UE.

Specifically, the service requirement indication may indicate that the UE requests discovery for a purpose of discovering a surrounding proximity-based device; or that the UE requests discovery for a purpose of discovering a surrounding proximity-based device that can perform D2D communication; or that the UE requests discovery for a purpose of discovering a surrounding proximity-based device and identifying a device that is among discovered proximity-based devices and can meet a requirement for D2D communication. The discovery range indication includes that a device object to be discovered by the UE is another device within a specific distance range around the UE, for example, a device within a range of wo meters or within a range of 200 meters is to be discovered.

202. Generate discovery configuration information according to the discovery category indication, and send the discovery configuration information to a base station, so that the base station controls, according to the discovery configuration information, the UE to discover another UE near the UE, where the discovery configuration information is used to configure a parameter that is used when the base station or the UE detects another nearby UE.

It may be understood that generally, the server may communicate with the base station by virtue of another network element in a communications system. For example, the server may send the discovery configuration information to the MME, and then the MME forwards the discovery configuration information to the base station. The discovery configuration information delivered by the server to the MME may carry the UE identifier and the discovery category indication. Optionally, the server may further convert the UE identifier into a broadcast code of the UE, convert the target UE list into a broadcast code list of target UEs, and send the broadcast code list of the target UEs to the base station as the discovery configuration information.

203. The base station controls, according to the discovery configuration information, the UE to discover the another nearby UE.

The base station may control, according to the discovery configuration information, the UE to measure another UE within a specific range; or the base station may control, according to the discovery configuration information, the UE to measure another surrounding UE that can perform communication, or may control, according to the discovery configuration information, the UE to detect another surrounding UE that is within a specific distance range and can perform communication. Further, the base station may control the UE to detect a UE that is in the target UE list and meets distance and communication requirements.

It should be noted that a measurement method in which a base station detects another UE near a UE pertains to the prior art. After multiple times of interaction between the base station and the UE, the base station can acquire information about another surrounding UE detected by the UE.

204. The base station reports a discovery result to the server.

The UE may send all identifiers of other detected surrounding UEs to the base station, and the base station performs filtering according to the discovery configuration information, so as to obtain a list of UEs that meet a requirement of the discovery category indication. In some embodiments, the UE may perform detection according to a configuration parameter in the discovery configuration information, and feedback a list of UEs that meet a requirement of the discovery configuration information to the base station.

It may be understood that the base station may also report the discovery result to the server by using another network element in the communications system, which is similar to a method in which the server delivers the discovery configuration information. For example, the base station may include the discovery result into a discovery report message and send the discovery report message to the MME, and the MME forwards the discovery result to the server.

205. The server sends the discovery result to the UE.

In this embodiment, because the UE initiates the discovery request, after obtaining the discovery result that meets a requirement of the UE, the server feeds back the discovery result to the UE. Optionally, a server side may pre-configure grouping information of the UE, and after receiving the discovery result, the server side may identify discovered proximity-based UEs in groups. The discovery result may be: a list of UEs detected by the base station or the UE, where the detected UEs are near the UE and meet the requirement of the discovery category indication. In some embodiments the discovery result may be a list of UEs that are near the UE and detected by the base station or the UE, and service information, distance information, and/or group information of each detected UE.

According to the device discovery method provided in this embodiment of the present invention, a UE includes a discovery category indication into a discovery request, and a server generates discovery configuration information according to the discovery category indication, thereby discovering a nearby proximity-based UE of a specific category. Compared with a method in a current system in which all nearby UEs need to be discovered, the device discovery method has the following advantages. Another UE of a category designated by a user may be discovered near the UE according to a user requirement, and a discovery result can meet a communication requirement of the user, thereby reducing unnecessary signaling interaction and reducing power consumption of the UE.

Figure 3:
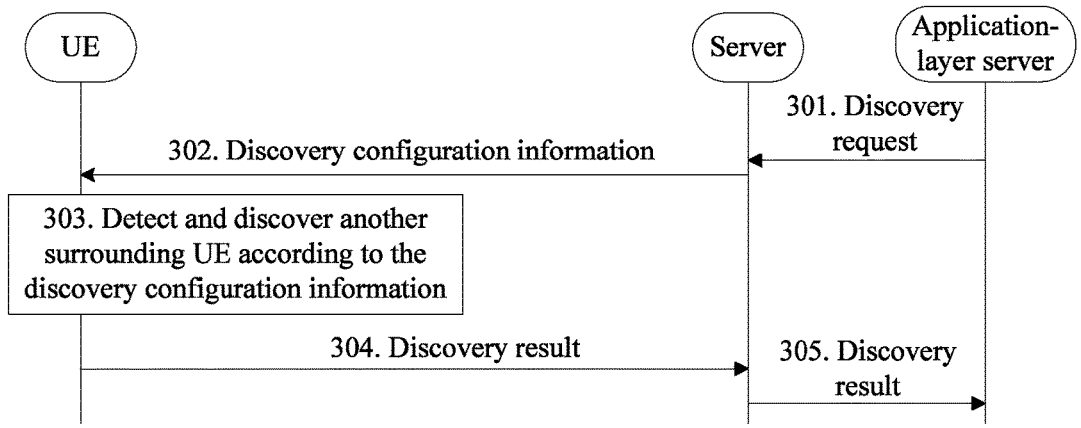
FIG. 3 is a flowchart of a device discovery method according to another embodiment of the present invention.

In another embodiment of the present invention, a discovery request may also be initiated by an application-layer server rather than a UE. Specifically, referring to FIG. 3, a device discovery method in this embodiment of the present invention may include the following procedures.

301. The application-layer server initiates the discovery request to a server, where the discovery request includes a UE identifier and a discovery category indication.

The application-layer server may be a server for a social application, a positioning application, or the like. For example, the application-layer server may be a server for QQ or MSN, or may be a server for a national security positioning system, which is not limited in this embodiment of the present invention. It may be understood that when initiating the discovery request, the application-layer server may include, into a request message, an identifier of a UE that is going to perform surrounding device discovery, so that the server performs configuration and controls discovery of another device around the UE corresponding to the UE identifier. The UE identifier may be an inherent identifier of the UE, or may be a temporary identifier.

302. The server generates discovery configuration information according to the discovery category indication, and delivers the discovery configuration information to a UE corresponding to the UE identifier.

The server directly sends the discovery configuration information to the UE, where the discovery configuration information may include a service requirement indication and/or discovery range indication, or the like, and may further include a list of target UEs that are expected to be detected in this discovery request. The target UE list may be configured by the application-layer server, or may be configured on the server in advance, or may be configured on another data network element in a communications system, so that the server can acquire the target UE list in a timely manner. Each target UE in the target UE list may be identified by using a fixed identifier, a temporary identifier, or a broadcast code.

303. The UE detects and discovers another surrounding UE according to the discovery configuration information, so as to obtain a discovery result.

In this embodiment, other network element devices, such as an MME and a base station, are not described, and reference may be made to an existing message forwarding and controlling method. Other network element devices cooperate with the UE and the server to implement the device discovery method in the present invention, and details about a specific forwarding and controlling process of an intermediate device are not described herein again.

304. The UE sends the discovery result to the server.

305. The server feeds back the discovery result to the application-layer server.

Because the discovery request is initiated by the application-layer server, the discovery result may be fed back to the application-layer server. For example, MSN may detect a nearby buddy by using the method in the present invention, and may further initiate proximity-based communication after detecting the nearby buddy proximity-based.

Optionally, in this embodiment, steps 302-304 may also be replaced with steps 202-204 in FIG. 2. The discovery configuration information is sent to a base station, and the base station controls the UE to perform proximity-based device discovery.

According to the device discovery method provided in this embodiment of the present invention, an application-layer server that initiates a discovery request includes a discovery category indication into the discovery request, and a server generates discovery configuration information according to the discovery category indication, thereby discovering a nearby proximity-based UE of a specific category. Compared with a method in a current system in which all nearby UEs need to be discovered, the device discovery method has the following advantages. Another UE of a category designated by a user may be discovered near a UE according to a user requirement, and a discovery result can meet a communication requirement of the user, thereby reducing unnecessary signaling interaction and reducing power consumption of the UE.

In another embodiment of the present invention, a specific category of device discovery may be limited according to a service requirement, a discovery range, a target UE, or the like; in addition, a capability of a UE and a group to which a UE belongs may also be distinguished. Specifically, referring to FIG. 4, a device discovery method in this embodiment of the present invention may include the following procedures.

401. When registering with a server, a UE2 sends its capability information and/or group information to the server.

When registering with the server, the UE2 may send its own Wireless Fidelity (Wi-Fi) configuration, such as a service set identifier (SSID) or Wi-Fi security information to the server.

402. A UE1 initiates a discovery request to the server, where the discovery request includes a discovery category indication.

The discovery category indication may include at least one of the following: a service requirement indication, a discovery range indication, a target UE list, a capability requirement indication, and a target group indication. Specifically, the capability requirement indication is used to indicate a communication capability, such as a capability of supporting Wi-Fi or a capability of supporting Long Term Evolution (LTE) of a target device that the UE1 expects to discover Wi-Fi. For example, the UE1 may request to discover another nearby UE that is within a range of 200 meters and supports the LTE, or the UE1 may request to discover a nearby UE that can meet a communication service requirement and belongs to a "colleague group". It may be understood that a network side may pre-configure a group list, grouping information, or the like, or a UE may upload the information to the network side in advance. Optionally, the discovery request may further include a list of target UEs that the UE1 requests to discover, for example, provide a buddy list of the UE1.

It may be understood that in this embodiment, the UE1 may also be an application-layer server, and this embodiment of the present invention is described only by using an example of a scenario in which the UE1 initiates the discovery request.

403. The server generates discovery configuration information according to the discovery category indication and the capability information and/or the group information of the registered UE2, and sends the discovery configuration information to the UE1.

Optionally, if the discovery request includes the target UE list and the capability requirement indication, after receiving the discovery request, the server may filter the target UE list according to a capability requirement requested by the UE1, so as to obtain a list of target UEs that meet the capability requirement of the UE1. Capability information of each UE is already acquired in step 401. The server may use broadcast codes of all UEs in a filtered target UE list as the discovery configuration information, and send the discovery configuration information to the UE1 or a base station, so that the UE1 performs detection on these UEs, or the base station controls the UE1 to perform measurement.

Alternatively, if the discovery request includes target group information, the server may determine, according to the target group information and the pre-configured group information and group list, UE IDs included in a group requested by the UE1. A server side may pre-configure different group IDs and a UE list corresponding to each group ID. The group information and group lists may also be configured on another network element on a network side, and may be obtained by the server by querying an operator network database or forwarded by an MME, or the like, which is not limited in this embodiment of the present invention.

404. The UE1 discovers another nearby UE according to the discovery configuration information.

The UE1 may measure the broadcast codes of the UEs in the target UE list. Optionally, in this embodiment, a process in which the server delivers the discovery configuration information to the UE1 and the UE1 performs measurement may also be replaced with a process shown in FIG. 2 in which a server delivers discovery configuration information to a base station and the base station controls, according to the broadcast codes of the UEs in the discovery configuration information, measurement between a UE1 and target UEs.

405. The UE1 sends a first discovery result to the server, where the first discovery result includes a broadcast code of another surrounding UE that is detected by the UE1 according to the discovery configuration information and meets a requirement of the discovery configuration information.

406. The server sends a second discovery result to the UE1, where the server may convert broadcast codes of all UEs in the first discovery result into UE identifiers, and send the UE identifiers to the UE1 as the second discovery result, so that the UE1 may initiate a service process such as D2D communication according to these UE identifiers in the second discovery result.

It may be understood that if the discovery request is not initiated by the UE1, for example, may be initiated by an application-layer server, after detecting the another surrounding UE, the UE1 sends the discovery result to the server, so that the server sends the discovery result to a device that initiates the discovery request. For a procedure of S406, reference may be made to FIG. 3, and details are not described herein again in this embodiment of the present invention.

According to the device discovery method provided in this embodiment of the present invention, a server delivers discovery configuration information corresponding to a discovery category indication to a UE or a base station according to the discovery category indication in a discovery request. Compared with a method in a current system in which all proximity-based devices around a UE are discovered jointly, the device discovery method has the following advantages. A category of a proximity-based device that needs to be discovered may be detailed, and UE detection burden and signaling interaction with a network side may be reduced, thereby reducing power consumption of the UE.

Figure 5:
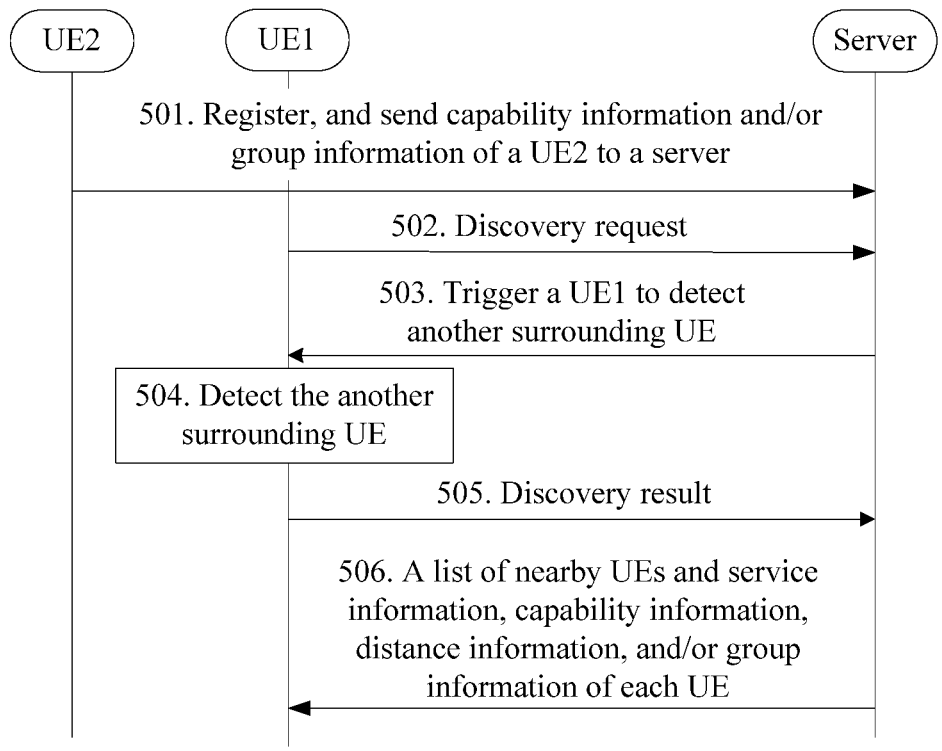
FIG. 5 is a flowchart of a device discovery method according to another embodiment of the present invention.

Further, in another embodiment of the present invention, in order to provide a UE1 with more adequate reference information to make it convenient for the UE1 to learn about a situation of another surrounding UE in more detail, a server may not designate, in discovery configuration information, a target UE list of a specific capability or a group. Instead, after the UE1 discovers the another surrounding UE, the server identifies capability information, group information, or the like. Specifically, referring to FIG. 5, a method in this embodiment may further include the following steps.

501. When registering with a server, a UE2 sends its capability information and/or group information to the server.

Figure 4:
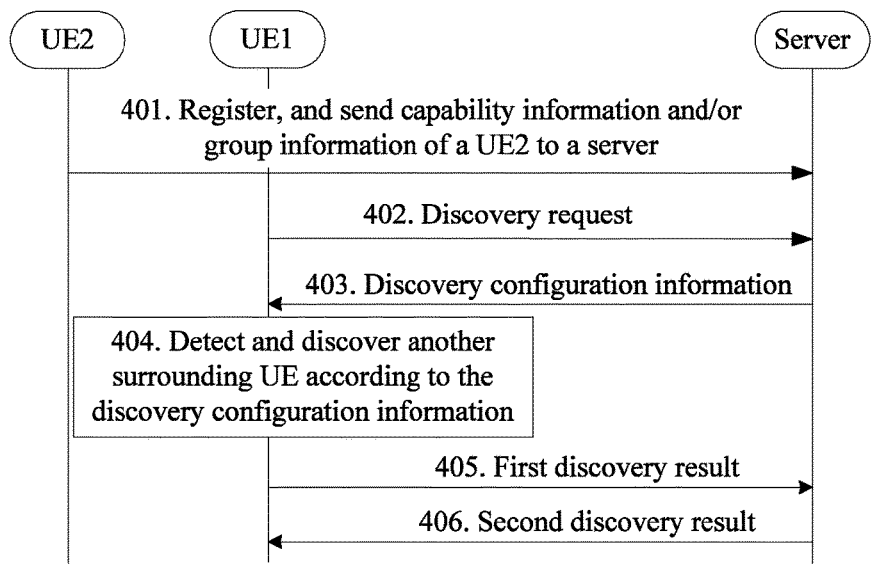
FIG. 4 is a flowchart of a device discovery method according to another embodiment of the present invention.

Step 501 in this embodiment is similar to 401 in FIG. 4. Reference may be made to corresponding content in FIG. 4, and details are not described herein again in this embodiment.

502. The UE1 initiates a discovery request to the server, where the discovery request includes a discovery category indication.

In this embodiment, the discovery request sent by the UE1 to the server may include the discovery category indication, and the discovery category indication is used to instruct the server to trigger a procedure of discovering a proximity-based device around the UE1, and feedback another detected surrounding UE, capability information and/or group information of each UE, and the like to the UE1.

503. The server triggers the UE1 to detect a surrounding proximity-based device.

When triggering the UE1 to detect the surrounding proximity-based device, the server may deliver the discovery configuration information according to an existing trigger mechanism, or may limit, in the discovery configuration information, only a discovery range that needs to be detected, or a service requirement of a device that needs to be discovered, or may include a relatively broad target UE list into the discovery configuration information without limiting group information or capability information of a target UE, or may constitute no category limitation, but only instruct the UE1 to discover another UE around the UE1.

504. The UE1 detects another nearby UE.

In this embodiment, a process in 503-504 in which the server triggers the UE1 to detect another nearby UE and the UE1 performs detection pertains to the prior art, and details are not described again in this embodiment.

505. The UE1 sends a discovery result to the server.

The UE1 may detect another proximity-based UE around, and the discovery result may include a relatively large quantity of UEs that are detected around. For example, if the service requirement, a distance range, capability information, or group information is not limited in the discovery configuration information in step 503, the UE1 can detect as many surrounding UEs as possible, and send a list of the detected UEs to the server as the discovery result. Certainly, the discovery result may further include information, such as a distance between each detected UE and the UE1, and a service capability of each detected UE.

506. The server sends a list of UEs that are near the UE1 and detected by the UE1, and service information, capability information, distance information, and/or group information of each UE to the UE1.

According to the list of nearby UEs fed back by the UE1, the server may identify these detected UEs according to acquired or configured capability information and group information of a UE. For example, the server identifies which UE has a Wi-Fi capability, which UE has an LTE capability, which group these detected UEs separately belong to, distances between these detected UEs and the UE1, and the like, so that the UE1 can fully learn about a situation of the another surrounding UE.

According to the device discovery method provided in this embodiment of the present invention, a service capability, distance information, capability information, a group, or the like of another surrounding device detected by a UE1 is identified in a discovery result fed back by a server. Compared with a method in a current system in which device discovery is performed indiscriminately on devices around, the device discovery method has the following advantage. Adequate identification information may be provided according to a requirement of a UE, so that the UE may perform communication more effectively according to the discovery result and does not perform unnecessary interaction that is doomed to failure, thereby reducing signaling interaction and reducing power consumption of the UE.

Figure 6:
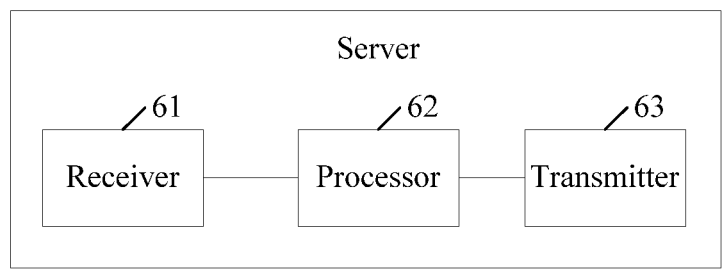
FIG. 6 is a schematic composition diagram of a server according to another embodiment of the present invention.

Another embodiment of the present invention provides a server. As shown in FIG. 6, the server includes: a receiver 61, a processor 62, and a transmitter 63.

The receiver 61 is configured to receive a discovery request, where the discovery request is used to request to discover another UE near a user equipment (UE), and the discovery request includes a discovery category indication.

The processor 62 is configured to generate discovery configuration information according to the discovery category indication received by the receiver 61.

The transmitter 63 is configured to send the discovery configuration information generated by the processor 62 to a base station or the UE, so that the base station or the UE discovers another UE near the UE according to the discovery configuration information, where the discovery configuration information is used to configure a parameter that is used when the base station or the UE detects another nearby UE.

The receiver 61 is further configured to receive a discovery result sent by the base station or the UE.

Further, the discovery category indication includes at least one of the following: a service requirement indication, a discovery range indication, a target UE list, a capability requirement indication, and a target group indication.

Further, the receiver 61 is further configured to: before receiving the discovery request, receive capability information and/or group information of the UE that registers with the server.

When the discovery category indication includes the capability requirement indication and/or the target group indication, the processor 62 is further configured to generate the discovery configuration information according to the capability requirement indication and/or the target group indication received by the receiver 61 and the capability information and/or the group information of the UE that registers with the server.

Further, the discovery result includes a list of UEs detected by the base station or the UE, where the detected UEs are near the UE and meet a requirement of the discovery category indication.

Further, the receiver 61 is further configured to: before receiving the discovery request, receive the capability information and/or the group information of the UE that registers with the server.

The discovery category indication is used to instruct the server to: trigger detection on the another UE around the UE, and feedback, after the detection is complete, a list of all detected UEs, and service information, capability information, distance information, and/or group information of each UE.

Further, the discovery result includes a list of UEs that are near the UE and detected by the base station or the UE, and service information, capability information, distance information, and/or group information of each UE.

Further, the transmitter 63 is further configured to, if the discovery request is a discovery request sent by the UE, send the discovery configuration information to the base station, so that the base station performs device discovery according to the discovery configuration information; and after the discovery result sent by the base station is received, send the discovery result to the UE. Alternatively, if the discovery request is a discovery request sent by an application server, the transmitter 63 is further configured to send the discovery configuration information to the base station or the UE, so that the base station or the UE performs device discovery according to the discovery configuration information. After the discovery result sent by the base station or the UE is received, the transmitter 63 is further configured to send the discovery result to the application server.

According to the server provided in this embodiment of the present invention, a discovery request carries a discovery category indication, and the server generates discovery configuration information according to the discovery category indication, thereby discovering a nearby proximity-based UE of a specific category. Compared with a method in a current system in which all nearby UEs need to be discovered, the server has the following advantages. Another UE of a category designated by a user may be discovered near a UE according to a user requirement, and a discovery result can meet a communication requirement of the user, thereby reducing unnecessary signaling interaction and reducing power consumption of the UE.

Figure 7:
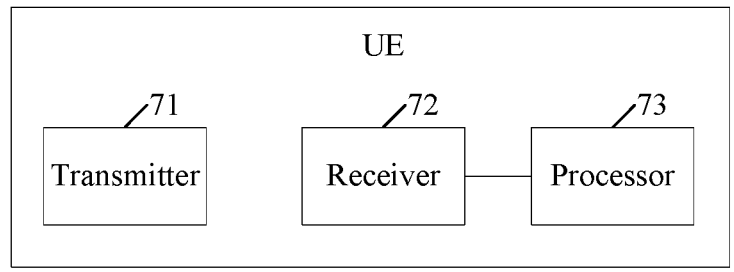
FIG. 7 is a schematic composition diagram of a UE according to another embodiment of the present invention.

Another embodiment of the present invention provides a UE. As shown in FIG. 7, the UE includes: a transmitter 71, a receiver 72, and a processor 73.

The transmitter 71 is configured to send a discovery request to a server, where the discovery request is used to request to discover another UE near the user equipment (UE), and the discovery request includes a discovery category indication, so that the server generates discovery configuration information according to the discovery category indication, and then controls, according to the discovery configuration information, the UE to discover another nearby UE, where the discovery configuration information is used to configure a parameter that is used when the base station or the UE detects another nearby UE.

The receiver 72 is configured to receive the discovery configuration information delivered by the server.

The processor 73 is configured to discover the another nearby UE under control of the server and according to the discovery configuration information received by the receiver 72, so as to obtain a discovery result.

Further, the discovery category indication includes at least one of the following: a service requirement indication, a discovery range indication, a target UE list, a capability requirement indication, and a target group indication.

Further, the transmitter 71 is further configured to, before sending the discovery request to the server, send capability information and/or group information of the UE to the server.

Further, the discovery result includes a list of UEs detected by the base station or the UE, where the detected UEs are near the UE and meet a requirement of the discovery category indication.

Further, the discovery result includes a list of UEs that are near the UE and detected by the base station or the UE, and service information, capability information, distance information, and/or group information of each UE.

According to the UE provided in this embodiment of the present invention, a discovery request carries a discovery category indication, so that a server generates discovery configuration information according to the discovery category indication, thereby discovering a nearby proximity-based UE of a specific category. Compared with a method in a current system in which all nearby UEs need to be discovered, the UE has the following advantages. Another UE of a category designated by a user may be discovered near the UE according to a user requirement, and a discovery result can meet a communication requirement of the user, thereby reducing unnecessary signaling interaction and reducing power consumption of the UE.

Figure 8:
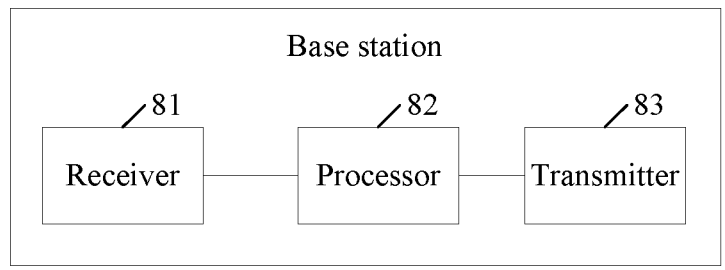
FIG. 8 is a schematic composition diagram of a base station according to another embodiment of the present invention.

Another embodiment of the present invention provides a base station. As shown in FIG. 8, the base station includes: a receiver 81, a processor 82, and a transmitter 83.

The receiver 81 is configured to receive discovery configuration information sent by a server, where the discovery configuration information is generated by the server according to a discovery category indication included in a discovery request, and is used to configure a parameter that is used when the base station detects another nearby UE.

The processor 82 is configured to discover the another nearby UE according to the discovery configuration information received by the receiver 81, so as to obtain a discovery result.

The transmitter 83 is configured to send the discovery result obtained by the processor 82 to the server, so that the server sends the discovery result to an initiator of the discovery request.

Further, the discovery category indication includes at least one of the following: a service requirement indication, a discovery range indication, a target UE list, a capability requirement indication, and a target group indication.

Further, optionally, the discovery result includes a list of UEs detected by the base station, where the detected UEs are near the UE and meet a requirement of the discovery category indication.

Further, optionally, the discovery result includes a list of UEs that are near the UE and detected by the base station, and service information, capability information, distance information, and/or group information of each UE.

According to the base station provided in this embodiment of the present invention, a discovery request carries a discovery category indication, so that a server generates discovery configuration information according to the discovery category indication, thereby discovering a nearby proximity-based UE of a specific category. Compared with a method in a currnt system in which all nearby UEs need to be discovered, the base station has the following advantages: Another UE of a category designated by a user may be discovered near a UE according to a user requirement, and a discovery result can meet a communication requirement of the user, thereby reducing unnecessary signaling interaction and reducing power consumption of the UE.

Figure 9:
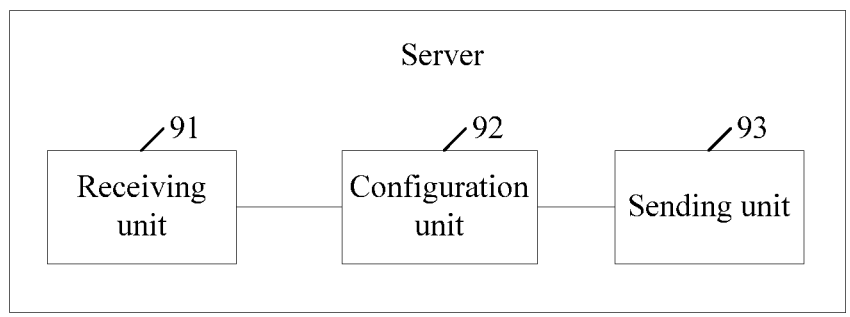
FIG. 9 is a schematic composition diagram of a server according to another embodiment of the present invention.

Another embodiment of the present invention provides a server. As shown in FIG. 9, the server includes: a receiving unit 91, a configuring unit 92, and a sending unit 93.

The receiving unit 91 is configured to receive a discovery request, where the discovery request is used to request to discover another UE near a user equipment (UE), and the discovery request includes a discovery category indication.

The configuring unit 92 is configured to generate discovery configuration information according to the discovery category indication received by the receiving unit 91.

The sending unit 93 is configured to send the discovery configuration information generated by the configuring unit 92 to a base station or the UE, so that the base station or the UE discovers another UE near the UE according to the discovery configuration information, where the discovery configuration information is used to configure a parameter that is used when the base station or the UE detects another nearby UE.

The receiving unit 91 is further configured to receive a discovery result sent by the base station or the UE.

Further, the discovery category indication includes at least one of the following: a service requirement indication, a discovery range indication, a target UE list, a capability requirement indication, and a target group indication.

Further, the receiving unit 91 is further configured to: before receiving the discovery request, receive capability information and/or group information of the UE that registers with the server; and when the discovery category indication includes the capability requirement indication and/or the target group indication, the configuring unit 92 is further configured to generate the discovery configuration information according to the capability requirement indication and/or the target group indication, and the capability information and/or the group information of the UE that registers with the server.

Further, the discovery result includes a list of UEs detected by the base station or the UE, where the detected UEs are near the UE and meet a requirement of the discovery category indication.

Further, the receiving unit 91 is further configured to: before receiving the discovery request, receive capability information and/or group information of the UE that registers with the server.

The discovery category indication is used to instruct the server to: trigger detection on the another UE around the UE, and feedback, after the detection is complete, a list of all detected UEs, and service information, capability information, distance information, and/or group information of each UE.

Further, the discovery result includes a list of UEs that are near the UE and detected by the base station or the UE, and service information, capability information, distance information, and/or group information of each UE.

Further, the sending unit 93 is further configured to: if the discovery request is a discovery request sent by the UE, send the discovery configuration information to the base station, so that the base station performs device discovery according to the discovery configuration information; and after the receiving unit 91 receives the discovery result sent by the base station, send the discovery result to the UE. Alternatively, the sending unit 93 is further configured to, if the discovery request is a discovery request sent by an application server, send the discovery configuration information to the base station or the UE, so that the base station or the UE performs device discovery according to the discovery configuration information; and after the receiving unit 91 receives the discovery result sent by the base station or the UE, send the discovery result to the application server.

According to the server provided in this embodiment of the present invention, a discovery request carries a discovery category indication, and the server generates discovery configuration information according to the discovery category indication, thereby discovering a nearby proximity-based UE of a specific category. Compared with a method in a current system in which all nearby UEs need to be discovered, the server has the following advantages. Another UE of a category designated by a user may be discovered near a UE according to a user requirement, and a discovery result can meet a communication requirement of the user, thereby reducing unnecessary signaling interaction and reducing power consumption of the UE.

Figure 10:
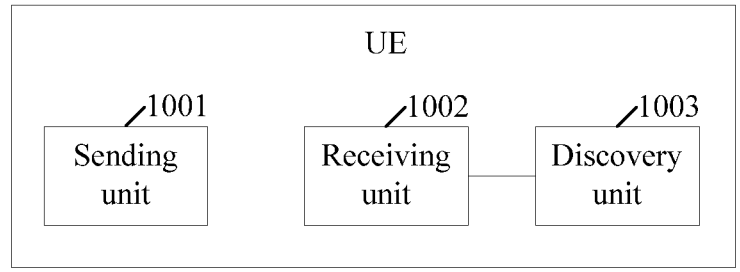
FIG. 10 is a schematic composition diagram of a UE according to another embodiment of the present invention.
Figure 11:
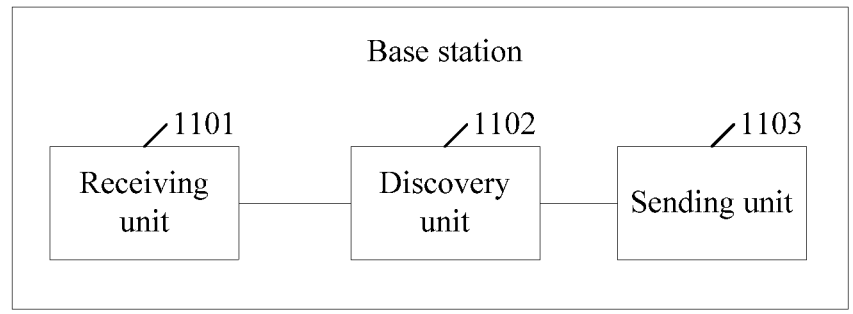
FIG. 11 is a schematic composition diagram of a base station according to another embodiment of the present invention.

Another embodiment of the present invention further provides a user equipment (UE). As shown in FIG. 10, the UE includes: a sending unit 1001, a receiving unit 1002, and a discovery unit 1003.

The sending unit 1001 is configured to send a discovery request to a server, where the discovery request is used to request to discover another UE near the user equipment UE, and the discovery request includes a discovery category indication, so that the server generates discovery configuration information according to the discovery category indication, and then controls, according to the discovery configuration information, the UE to discover another nearby UE, where the discovery configuration information is used to configure a parameter that is used when the base station or the UE detects another nearby UE.

The receiving unit 1002 is configured to receive the discovery configuration information sent by the server.

The discovery unit 1003 is configured to discover the another nearby UE under control of the server and according to the discovery configuration information received by the receiving unit 1002, so as to obtain a discovery result.

Further, the discovery category indication includes at least one of the following: a service requirement indication, a discovery range indication, a target UE list, a capability requirement indication, and a target group indication.

Further, the sending unit 1001 is further configured to, before sending the discovery request to the server, send capability information and/or group information of the UE to the server.

Further, optionally, the discovery result includes a list of UEs detected by the base station or the UE, where the detected UEs are near the UE, and meet a requirement of the discovery category indication.

Further, optionally, the discovery result includes a list of UEs that are detected by the base station or the UE and are near the UE and service information, capability information, distance information, and/or group information of each UE.

According to the UE provided in this embodiment of the present invention, a discovery request carries a discovery category indication, so that a server generates discovery configuration information according to the discovery category indication, thereby discovering a nearby proximity-based UE of a specific category. Compared with a method in a current system in which all nearby UEs need to be discovered, the UE has the following advantages. Another UE of a category designated by a user may be discovered near a UE according to a user requirement, and a discovery result can meet a communication requirement of the user, thereby reducing unnecessary signaling interaction and reducing power consumption of the UE.

Another embodiment of the present invention further provides a base station, including: a receiving unit 1101, a discovery unit 1102, and a sending unit 1103.

The receiving unit 1101 is configured to receive discovery configuration information sent by a server, where the discovery configuration information is generated by the server according to a discovery category indication included in a discovery request, and is used to configure a parameter that is used when the base station detects another nearby UE.

The discovery unit 1102 is configured to discover the another nearby UE according to the discovery configuration information received by the receiving unit 1101, so as to obtain a discovery result.

The sending unit 1103 is configured to send the discovery result obtained by the discovery unit 1102 to the server, so that the server sends the discovery result to an initiator of the discovery request.

Further, the discovery category indication includes at least one of the following: a service requirement indication, a discovery range indication, a target UE list, a capability requirement indication, and a target group indication.

Further, optionally, the discovery result includes a list of UEs detected by the base station, where the UEs are near the UE and meet a requirement of the discovery category indication.

Further, optionally, the discovery result includes a list of UEs that are near the UE and detected by the base station, and service information, capability information, distance information, and/or group information of each UE.

According to the base station provided in this embodiment of the present invention, a discovery request carries a discovery category indication, and a server generates discovery configuration information according to the discovery category indication, thereby discovering a nearby proximity-based UE of a specific category. Compared with a method in a current system in which all nearby UEs need to be discovered, the base station has the following advantages. Another UE of a category designated by a user may be discovered near a UE according to a user requirement, and a discovery result can meet a communication requirement of the user, thereby reducing unnecessary signaling interaction and reducing power consumption of the UE.

Figure 12:
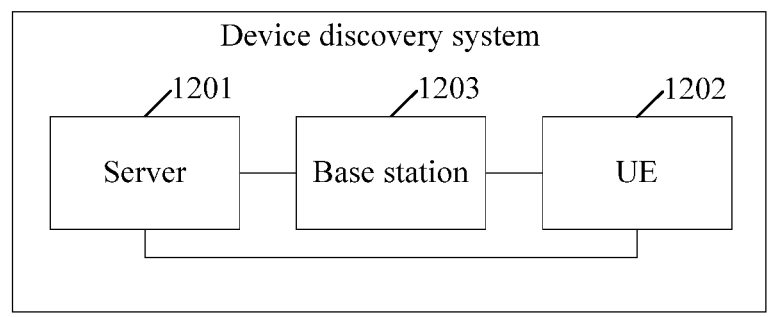
FIG. 12 is a schematic composition diagram of a device discovery system according to another embodiment of the present invention.

Another embodiment of the present invention further provides a device discovery system. As shown in FIG. 12, the device discovery system includes: a server 1201, a UE 1202, and a base station 1203.

The server 1201 is configured to: receive a discovery request, where the discovery request is used to request to discover another UE near the user equipment UE 1202, and the discovery request includes a discovery category indication; generate discovery configuration information according to the discovery category indication and send the discovery configuration information to the base station 1203 or the UE 1202, so that the base station 1203 or the UE 1202 discovers another UE near the UE 1202 according to the discovery configuration information, where the discovery configuration information is used to configure a parameter that is used when the base station 1203 or the UE 1202 detects another nearby UE; and receive a discovery result sent by the base station 1203 or the UE 1202.

The UE 1202 is configured to: send the discovery request to the server 1201, where the discovery request is used to request to discover another UE near the user equipment UE 1202, and the discovery request includes the discovery category indication, so that the server 1201 generates the discovery configuration information according to the discovery category indication, and then controls, according to the discovery configuration information, the UE 1202 to discover the another nearby UE, where the discovery configuration information is used to configure the parameter that is used when the base station 1203 or the UE 1202 detects another nearby UE; and discover the another nearby UE under control of the server 1201 and according to the discovery configuration information, so as to obtain the discovery result.

The base station 1203 is configured to: receive the discovery configuration information sent by the server 1201, where the discovery configuration information is generated by the server 1201 according to the discovery category indication included in the discovery request, and is used to configure the parameter that is used when the base station 1203 detects another nearby UE; discover the another nearby UE according to the discovery configuration information, so as to obtain the discovery result; and send the discovery result to the server 1201, so that the server 1201 sends the discovery result to an initiator of the discovery request.

According to the device discovery system provided in this embodiment of the present invention, a discovery request carries a discovery category indication, and a server 1201 generates discovery configuration information according to the discovery category indication, thereby discovering a nearby proximity-based UE of a specific category. Compared with a method in a current system in which all nearby UEs need to be discovered, the device discovery system has the following advantages: Another UE of a category designated by a user may be discovered near a UE 1202 according to a user requirement, and a discovery result can meet a communication requirement of the user, thereby reducing unnecessary signaling interaction and reducing power consumption of the UE 1202.

It may be understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. An apparatus, comprising:
   a non-transitory storage medium storing executable instructions; and
   a processor;
   wherein the executable instructions, when executed by the processor, cause the apparatus to:
      receive a discovery request message, wherein the discovery request message requests to discover a second user equipment (UE) near a first UE, and wherein the discovery request message comprises a discovery category indication;
      generate discovery configuration information according to the discovery category indication;
      send the discovery configuration information to the first UE, wherein the discovery configuration information is used by the first UE to configure a parameter that is used when the first UE detects the second UE; and
      receive a discovery result sent by the first UE.

2. The apparatus according to claim 1, wherein the discovery category indication comprises a service requirement indication, a discovery range indication, a target UE list, a capability requirement indication, or a target group indication.

3. The apparatus according to claim 2, wherein the executable instructions, when executed by the processor, further cause the apparatus to:
   before the discovery request message is received, receive capability information of the first UE when the first UE registers with a server; or
   before the discovery request message is received, receive group information of the first UE when the first UE registers with the server.

4. The apparatus according to claim 3, wherein the discovery category indication comprises the capability requirement indication or the target group indication; and
   wherein the executable instructions, when executed by the processor, further cause the apparatus to:
      generate the discovery configuration information according to the capability requirement indication or the target group indication comprised in the discovery category indication, and according to the capability information or the group information of the first UE that is received when the first UE registers with the server.

5. The apparatus according to claim 1, wherein the discovery result comprises a list of UEs detected by a base station or the first UE, wherein the UEs comprised in the list of UEs detected by the base station are each located near the first UE and each respectively meet a requirement of the discovery category indication.

6. The apparatus according to claim 1, wherein the executable instructions, when executed by the processor, further cause the apparatus to:
   send the discovery configuration information to a base station to send to the first UE.

7. The apparatus according to claim 1, wherein the executable instructions, when executed by the processor, further cause the apparatus to:
   send the discovery configuration information directly to the first UE.

8. An apparatus, comprising:
a storage medium storing executable instructions; and
a processor;
wherein the executable instructions, when executed by the processor, cause the apparatus to:
send a discovery request message to a server, wherein the discovery request message requests to discover a second UE near a first UE, and the discovery request message comprises a discovery category indication;
receive discovery configuration information from the server, wherein the discovery configuration information is used to configure a parameter that is used when the first UE detects the second UE; and
discover the second UE according to the discovery configuration information, to obtain a discovery result, wherein the second UE is under control of the server.

9. The apparatus according to claim 8, wherein the discovery category indication comprises a service requirement indication, a discovery range indication, a target UE list, a capability requirement indication, or a target group indication.

10. The apparatus according to claim 8, wherein the discovery result comprises a list of UEs detected by the first UE, wherein each UE comprised in the list of UEs is located near the first UE and each UE comprised in the list of UEs meets a requirement of the discovery category indication.

11. A non-transitory computer-readable storage medium comprising executable instructions stored thereon, wherein the executable instructions, when executed by a computer, cause the computer to:
receive a discovery request message, wherein the discovery request message requests to discover a second user equipment (UE) near a first UE, and wherein the discovery request message comprises a discovery category indication;
generate discovery configuration information according to the discovery category indication;
send the discovery configuration information to the first UE, wherein the discovery configuration information is used by the first UE to configure a parameter that is used when the first UE detects the second UE; and
receive a discovery result sent by the first UE.

12. The non-transitory computer-readable storage medium according to claim 11, wherein the discovery category indication comprises a service requirement indication, a discovery range indication, a target UE list, a capability requirement indication, or a target group indication.

13. The non-transitory computer-readable storage medium according to claim 12, wherein the executable instructions, when executed by a computer, further cause the computer to:
before the discovery request message is received, receive capability information of the first UE when the first UE registers with a server; or
before the discovery request message is received, receive group information of the first UE when the first UE registers with the server.

14. The non-transitory computer-readable storage medium according to claim 13, wherein the discovery category indication comprises the capability requirement indication or the target group indication; and
wherein the executable instructions, when executed by a computer, further cause the computer to:
generate the discovery configuration information according to the capability requirement indication or the target group indication comprised in the discovery category indication, and according to the capability information or the group information of the first UE that is received when the first UE registers with the server.

15. The non-transitory computer-readable storage medium according to claim 11, wherein the discovery result comprises a list of UEs detected by a base station or the first UE, wherein the UEs comprised in the list of UEs detected by the base station are each located near the first UE and each respectively meet a requirement of the discovery category indication.

16. The non-transitory computer-readable storage medium according to claim 11, wherein the executable instructions, when executed by a computer, further cause the computer to:
send the discovery configuration information to a base station to send to the first UE.

17. The non-transitory computer-readable storage medium according to claim 11, wherein the executable instructions, when executed by a computer, further cause the computer to:
send the discovery configuration information directly to the first UE.

18. A non-transitory computer-readable storage medium, comprising executable instructions stored thereon, wherein the executable instructions, when executed by a computer, cause the computer to:
send a discovery request message to a server, wherein the discovery request message requests to discover a second user equipment (UE) near a first UE, and the discovery request message comprises a discovery category indication;
receive discovery configuration information from the server, wherein the discovery configuration information is used to configure a parameter that is used when the first UE detects the second UE; and
discover the second UE according to the discovery configuration information, to obtain a discovery result, wherein the second UE is under control of the server.

19. The non-transitory computer-readable storage medium according to claim 18, wherein the discovery category indication comprises a service requirement indication, a discovery range indication, a target UE list, a capability requirement indication, or a target group indication.

20. The non-transitory computer-readable storage medium according to claim 18, wherein the discovery result comprises a list of UEs detected by the first UE, wherein each UE comprised in the list of UEs is located near the first UE, and each UE comprised in the list of UEs meets a requirement of the discovery category indication.

* * * * *